April 6, 1926.
J. S. JAMMER ET AL
1,579,708
INDICATING ELECTRICAL EFFECTS
Filed July 27, 1923  2 Sheets-Sheet 1
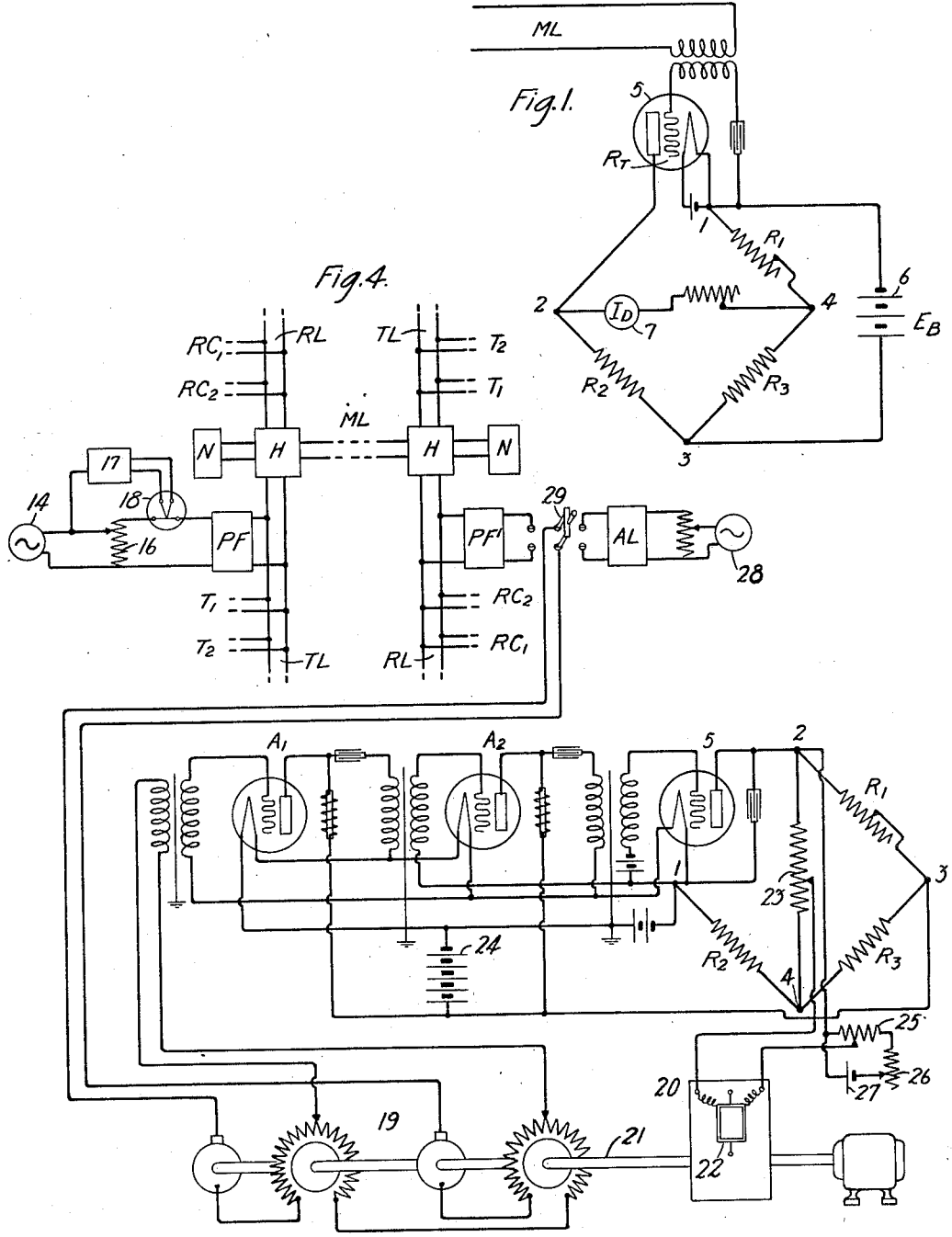
Inventors:
Jacob S. Jammer
Charles T. Anderson.
by E. W. Griggs  Att'y.

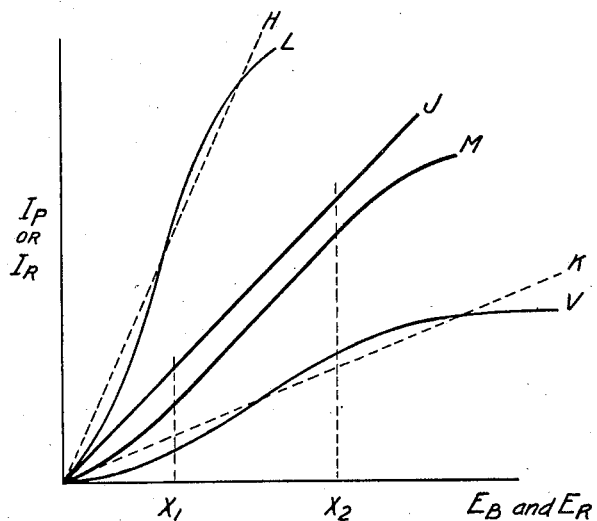
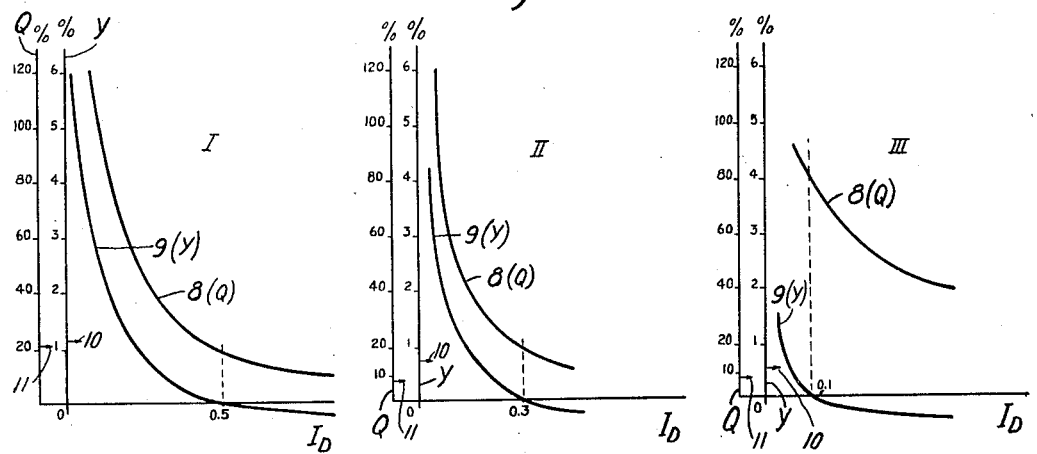

Patented Apr. 6, 1926.

1,579,708

UNITED STATES PATENT OFFICE.

JACOB S. JAMMER, OF NEW YORK, AND CHARLES T. ANDERSON, OF TOMPKINSVILLE, NEW YORK, ASSIGNORS TO WESTERN ELECTRIC COMPANY, INCORPORATED, OF NEW YORK, N. Y., A CORPORATION OF NEW YORK.

INDICATING ELECTRICAL EFFECTS.

Application filed July 27, 1923. Serial No. 654,105.

*To all whom it may concern:*

Be it known that we, JACOB S. JAMMER and CHARLES T. ANDERSON, citizens of the United States of America, and residing at New York, in the county of New York, and Tompkinsville, in the county of Richmond, both in the State of New York, respectively, have invented certain new and useful Improvements in Indicating Electrical Effects, of which the following is a full, clear, concise, and exact description.

The present invention relates to electric discharge device circuits and to methods of operating them to secure improved results.

The invention is particularly applicable to circuits of this general character employed to measure, receive or indicate electrical effects, especially where a quantitative response is to be obtained.

An object of the invention is to render the receiving or indicating device sensitive to received impulses but highly immune to variable effects in the local circuits of the device.

Other objects and the various features of the invention will appear as the description proceeds.

In the specific embodiment of the invention to be described a balanced type of circuit is used for balancing out the undesired locally-produced fluctuations. This may take the form of a Wheatstone bridge circuit with the plate circuit of a vacuum tube in one arm of the bridge and the indicating device in the diagonal of the bridge which is neutral with respect to the circuit in which the undesired fluctuations occur.

Wheatstone bridge circuits employing a vacuum tube in one arm of the bridge have been proposed heretofore, but so far as applicants are aware it has been the belief that to secure the desired results the bridge should be used in the balanced condition.

Applicants have discovered that a certain more-or-less critical adjustment of unbalance of the bridge results in a high degree of sensitivity to received impulses, as well as stability of the circuit, and in almost complete immunity from fluctuations in the local operating circuits. It has been experimentally demonstrated in a number of bridge circuits constructed by applicants that these circuits could be operated to receive and measure accurately small received currents when such large variations existed in the local operating circuits as would have made a balanced bridge practically inoperative and of less use than a tube circuit used independently of any type of bridge circuit.

Applicants have discovered that an ordinary electron discharge tube may be made to give a constant unbalance current when employed in one arm of a bridge of which the other arms are ohmic resistances, for widely varying values of anode voltage. This renders the invention especially valuable in balancing out the effect upon an indicator of fluctuations in the plate or "B" voltage of a tube. Since the ordinary vacuum tube does not possess an internal resistance, which follows Ohm's law, it would be impossible to maintain an accurate balance of such a bridge with a source of varying plate voltage for the tube since the plate-filament resistance would change to a different value with every variation in plate voltage and would unbalance the bridge in one direction or the other.

In the case of a bridge consisting wholly of ohmic resistances, the unbalance current varies with the voltage applied. In order to maintain the unbalance current constant, therefore, it is necessary to employ for at least one of the bridge resistances an element which does not follow Ohm's law. Applicants have taken advantage of this fact and of the variable-resistance properties of a vacuum tube with variable applied voltage, in constructing a bridge capable of maintaining a constant unbalance current regardless of variations in the applied voltage within wide limits of variation. The bridge so constructed and so operated is very stable in adjustment, and is highly sensitive to the impulses to be received, these impulses serving to produce variations in the otherwise constant unbalance current.

In the drawings, Fig. 1 is a schematic representation of a bridge circuit according to the invention; Fig. 2 shows characteristic curves to be referred to in the description; Fig. 3 shows curves explanatory of the relations obtaining in typical bridge circuits according to the invention; and Fig. 4 illustrates an application of the invention to a gain-control or pilot channel of a carrier current system.

In Fig. 1 the discharge tube has its plate-filament impedance included as one of the arms of a Wheatstone bridge circuit of which the other arms are $R_1$, $R_2$ and $R_3$, so that the diagonals 1—3 and 2—4 are conjugate. The plate battery 6 supplies a voltage $E_B$ across the plate and filament of the tube 5, causing a current $I_P$ to flow through the tube 5, and currents $I_1$, $I_2$ $I_3$ and $I_D$ to flow through the resistances $R_1$, $R_2$ and $R_3$ and the indicator 7, respectively.

It has been found that, if the relative values of $R_1$, $R_2$, $R_3$, and the resistance of the indicator branch 2, 7, 4 are properly selected in the manner described below, the current condition of the indicator branch 2, 7, 4 will remain the same regardless of variations in $E_B$,—that is, whether initially there is a current flowing in the branch 2, 7, 4 or not, no current change through this branch will occur.

The problem of obtaining the proper impedance ratios will be greatly simplified if $I_2$ is made substantially equal to $I_3$. If the resistance of the indicator branch were zero the currents $I_2$ and $I_3$ could be exactly equal and still permit an unbalance current to flow. This condition can be approached by making the resistance of the indicator branch very small in comparison with $R_2$ and $R_3$.

On the assumption that the resistance of the indicator branch is very small as compared with $R_1$ and $R_2$, and that $R_2$ very nearly equals $R_3$, it follows that $I_2$ very nearly equals $I_3$ and the relations between the currents in the different arms of the bridge may be expressed as follows:

$$I_2 - I_P = I_1 - I_3 = I_D$$
$$I_1 - I_P = 2I_D$$

Therefore, if the current in the indicator branch $I_D$ is to remain constant for a given range of impressed voltage $E_B$, $I_1 - I_P$ must remain constant and, therefore, the increments of variation of $I_1$ with $E_B$ and of $I_P$ with $E_B$ must be equal. This is true for a condition of zero current in the indicator branch or for a small unbalance current.

If there is an unbalance current, however, as shown by the second equation above $I_P$ is different from $I_1$ by substantially twice the amount of the unbalance current, assuming that $R_2=R_3$ and that the resistance of the indicator branch is practically zero. It follows, therefore, that if the change in $I_P$ is equal to the change in $I_1$ with different $E_B$ values, the resistances $R_T$ and $R_1$ cannot both obey Ohm's law. For if they did obey Ohm's law they would have the same percentage change, but since they must be unequal to permit the unbalance current to flow, the same percentage change is not equivalent to the same actual change in current through these arms. By making $R_1$ a pure resistance, the current change through it will vary directly with the voltage. Advantage is taken of the fact that the resistance $R_T$ of the tube 5 decreases as $E_B$ increases, so that for some value of $R_1$ the changes in resistance in $R_T$ with changes in $E_B$ permit $I_1 - I_P$ to remain constant over a wide range of $E_B$ values.

This is more clearly seen from the curves in Fig. 2. The three straight lines H, J and K, are characteristic "curves" of ohmic resistances of different values, K representing the curve of the highest resistance, J intermediate, and H the lowest. These lines simply show the law of increase of current $I_R$ with increase of applied voltage $E_R$.

The curves L, M and V are characteristic curves showing variation of plate current $I_P$ with plate voltage $E_B$ of a typical vacuum tube with successively different amounts of resistance associated with it.

By comparing these curves, it will be seen that the curves H and L do not have the same slope for any considerable part of their length, indicating that the change of current with applied voltage is in disagreement for these two curves throughout practically the whole range represented by the curves. The same is true of the curves K and V. The curves J and M, however, are substantially parallel over the voltage range $x_1$ to $x_2$, showing that the change in $I_P$ is very closely equal to the change of $I_R$ as the applied voltage varies between these limits.

If the tube 5 of Fig. 1 has a characteristic similar to M, therefore, and if the resistance $R_1$ is of such a value as to have the characteristic J, the current condition of the indicator 7 will remain independent of variations in $E_B$ throughout the range of varation represented by $x_1$ to $x_2$, at least. At any value of $E_B$ between these limits $(I_1 - I_P)$ is proportional to $I_D$.

Changing the value of $R_1$ not only varies the slope of the curve J but it also determines the position of the characteristic M among the family of curves of which L, M and V are members. For if the resistance of the indicator branch is negligible it is seen that $R_2$ and $R_3$ are in parallel with each other and that this parallel combination is in series with the plate circuit of tube 5, whereas $R_1$ is in shunt with the plate circuit, with reference to $E_B$. It is well known that the characteristic of a tube can be shifted in the direction from L toward M and V either by adding series resistance to the plate circuit or by decreasing resistance in shunt of the plate circuit. Decreasing $R_1$, therefore, not only moves the pure resistance line J toward H but moves the tube characteristic M towards V, and for some critical value of $R_1$ the parallel relation between J and M is obtained which gives a constant $I_D$ for variations of $E_B$.

Variations in grid voltage due to an impressed impulse affect the current in the arms $R_T$, $R_2$, $R_3$ and in the indicator branch, but do not affect the arm $R_1$ appreciably. The received impulses are therefore indicated at 7.

The curves in Fig. 3 are plotted upon a different basis from those of Fig. 2 and show three different conditions of loading employed in bridge circuits used by applicants. These curves were taken for a circuit similiar to that shown in Fig. 1 when a line ML of considerable attenuation was used, with a source of constant input alternating current at the far end of the line, the tube 5 acting as a rectifier to produce rectified current $I_D$ in the indicator 7. The abscissæ represent $I_D$ values, the ordinates Y (to which curve 9 is referred) represent the percent change in $I_D$ with changes in $E_B$, and the ordinates Q (to which curve 8 is referred) represent changes in $I_D$, with changes in line attenuation.

Curve 9 is plotted to show percentage variation of $I_D$ resulting from a one-volt variation in $E_B$ at the normal value, which in this case was 160 volts. Curve 8 is a sensitivity curve showing the present variation in $I_D$ for one mile of standard cable change in line attenuation, this being equivalent to about 11.5% change in line current. For purposes of rough comparison the percent variation of $I_B$ with $E_B$ is given at 10, and the percent change in $I_B$ with line attenuation is given at 11.

In taking the readings for the sets of curves I, II, III the constants of the circuit remained the same except that the applied line current was successively larger, the value of $R_1$ was changed over successively lower-resistance ranges (to determine $I_D$, and the tube impedance $R_T$, became successively smaller due to the increased grid potential variations, resulting in successively larger $I_B$ values, in the order of curves from I to III.

The point where the curve 9 crosses the horizontal axis indicates the value of $I_D$ which has a zero variation for a volt change in $E_B$, that is, the value of $I_D$, as determined by the adjustment of $R_1$, which is independent of changes in $E_B$.

In the curves I, the sensitivity at this value of $I_D$ is about the same as though the indicator were placed in the output of a tube the equivalent of tube 5 employed without a bridge circuit but with the same impedance in its plate circuit. This is shown by the fact that the point 11 representing the percent change in $I_B$ for a given change in input voltage is at about the same height as the ordinate of curve 8 at the critical value of $I_D$. In curves II and III, however, the corresponding point on curve 8 is higher than the point 11, showing that more amplification is obtained with the bridge circuit than would be obtained with a simple tube circuit under the conditions assumed.

By referring to the point 10 it will be seen that the plate current varies about 1 1/4 per cent for one volt change in $E_B$ at 160 volts in the case of curves I, and 7/10 per cent in the case of curves II, and about 6/10 per cent in the case of curves III.

These curves do not show the range of variation of $E_B$ within which $I_D$ remains constant. In an actual system installed on a physical line in which the average value of $E_B$ is 130 volts, it is found that $I_D$ remains very nearly constant for values of $E_B$ from about 55 volts to 190 volts.

Referring now to Fig. 4, the line ML may be a multiplex carrier line terminating, at each of the two stations, shown, in hybrid coils H, H, and balancing networks N, N. At each station transmitting and receiving loops TL and RL are branched from the mutually conjugate terminals of the respective hybrid coil. Channel branches $T_1$, $T_2$ lead to carrier transmitting sets, and branches $RC_1$, and $RC_2$ lead to corresponding receiving sets, in accordance with usual practice. Carrier waves of distinctive frequencies are used for effecting exclusive communication between corresponding sets. In addition to the signaling sets, a pilot channel is also associated with the line ML and employs an indicating circuit at the receiver embodying the invention. The pilot channel uses a wave of a frequency distinct from the carrier frequencies of the signaling channels.

The pilot channel comprises at one station a transmitting oscillator 14, a pilot frequency selective circuit PF, and a current regulator 16, 17, 18. The source 14 may be of the type disclosed in U. S. patent to Hartley No. 1,356,763, October 26, 1920. The element 16 is a potentiometer for varying the voltage impressed on the selective circuit and line. This potentiometer is preferably regulated automatically to maintain the current impressed on the line at a constant level. The automatic controller 17 is arranged in suitable manner to move the variable tap of the potentiometer in response to slight variations in output current as detected by the thermo-couple 18, the direction of adjustment of 16 being always such as to compensate in the outgoing circuit for variations in the oscillator current. The controller 17 may be of the type disclosed in U. S. patent to Brewer No. 1,356,804, October 26, 1920, or any other suitable type of automatic controller.

The receiving terminal of the pilot channel comprises the selective circuit PF', the potentiometer 19, with its automatic controlling device 20, the amplifier $A_1$, $A_2$, and the detector 5 with the associated bridge $R_1$, $R_2$ etc.

The controller 20 may be of the type shown in the patent to Brewer, cited. The control shaft 21 of this device is suitably geared to the variable taps on the potentiometer 19 so as to vary the voltage applied to the amplifier $A_1$ when the galvanometer 22 is deflected.

The branch 2—4 of the rectifier bridge contains in this instance a resistance 23. The bridge is adjusted in accordance with the principles above explained, so that an unbalance current flows in the resistance 23 and is independent of the voltage fluctuations of the plate battery 24, within the desired operating limits. Due to this current a steady drop of potential exists across resistance 23 except as it is altered by incoming variations from the line.

The galvanometer circuit includes the galvanometer coil 22, an adjustable portion of resistance 23, an adjustable portion of resistance 25, variable resistance 26 and a source 27 of constant potential.

A source 28 of pilot frequency current is also provided at the receiving terminal, associated with an artificial line AL.

The operation of the pilot channel is as follows:

Assuming that the variations in attenuation of the line ML from a reference value are to be indicated, the switch 29 is thrown to the right and oscillator 28 and artificial line AL are taken as the standard of reference to be used for the line. The artificial line AL may be variable or may have a predetermined value of attenuation representing the ideal or the desired attenuation for line ML. The current from source 28 is manually adjusted to have the same value as is to be sent from the distant station over the actual line.

With the artificial line in circuit, the desired manual adjustments of potentiometer 19 are made, and the resistance taps along resistances 23, 25 and 26 are adjusted to give zero deflection of galvanometer 22. The rectifier bridge will, of course, have been adjusted as described to balance out "B" voltage fluctuations.

With the above adjustments made, switch 29 is thrown to the left and the distant oscillator 14 and its control circuits are put into operation. If the attenuation of ML is exactly equal to that of AL no change occurs in the receiving circuit and the recording pen (not shown) operated from control shaft 21 records normal attenuation for the line.

As the attenuation of line ML departs from normal, corresponding variations occur in the strength of the received current. These current changes appear in amplified form in the resistance 23, causing the galvanometer 22 to deflect and to effect such an adjustment of potentiometer 19 as will restore the current in branch 23 to its normal value. The change of adjustment of potentiometer 19 is recorded by the recording pen.

Battery 24 is usually the plant battery at the local exchange or it may be the plant battery for Morse telegraph lines. As it becomes discharged and as it is recharged its voltage changes several per cent. Due, however, to the bridge circuit arrangement of the invention these voltage variations have no effect upon the controlling and indicating circuit.

By referring again to the curves 9 of Fig. 3, it will be seen that these curves cross the zero axis at a small slope. Instead of operating at the value of $I_D$ corresponding to complete compensation, a point to the left of this value representing under-compensation, or a point to the right indicating over-compensation, may be chosen.

It has been found that where other tubes such as the amplifiers $A_1$ and $A_2$ are fed from the same "B" battery as the tube 5, such a point on the curve 9 may readily be chosen as will fully compensate for the voltage fluctuations in the plate voltage of all of the tubes.

The indications on the controller chart may be made use of by an attendant to set the gain of the amplifiers employed in the various channels $T_1$, $T_2$, $RC_1$, $RC_2$, etc., or instructions may be sent to mid-line repeating stations (not shown) on the line ML, so as to maintain an even transmission level for the system.

The invention is applicable generally to vacuum tube and other types of circuits wherever a branch of a circuit is to be maintained free of variations in some other part of the circuit. It is particularly applicable in balancing out fluctuations arising from any cause in the plate voltage of vacuum tubes. Where machine generators and the like are used which give a variable voltage, the invention may be used to neutralize the voltage variations. Many other applications of the broad concept of the invention, as well as many alterations in the particular means for carrying it out, may be made within the scope of the appended claims.

The invention claimed is:

1. The method of operating a Wheatstone bridge circuit having the cathode-anode impedance of a vacuum tube in one arm of the bridge, ohmic impedances in the other arms of the bridge and a source of space current in a diagonal of the bridge, comprising selecting the ratio of said ohmic impedances to maintain an unbalance current of a value independent of fluctuations in the voltage of said source.

2. A Wheatstone bridge circuit comprising as one arm the cathode-anode impedance of a vacuum tube, a source of space current for said tube connected in one diagonal of the bridge, and an indicator arranged to respond to current variations occurring in the other diagonal of the bridge, the impedance ratios of the arms being such as to maintain a continuous flow of current through the diagonal with which the indicator is associated, of a value independent of fluctuations in voltage of said source.

3. A Wheatstone bridge circuit as claimed in claim 2, said vacuum tube having a grid or impedance controlling element, means to impress voltage variations across the grid and cathode of said tube, said indicator being arranged to respond to the voltage variations impressed on the grid.

4. A Wheatstone bridge circuit comprising ohmic resistances as three of the arms and the cathode-anode impedance of a vacuum tube as the fourth arm, a source of space current connected in a diagonal of the bridge, and an indicator connected to indicate current in the other diagonal of the bridge, the ratio of impedances between the respective arms being such as to maintain a constant unbalance current in the diagonal associated with the indicator for varying voltages of the source of space current.

5. A vacuum tube circuit balanced against fluctuations of applied anode voltage comprising three ohmic resistances connected end-to-end between the cathode and anode of the vacuum tube, an indicator connected between one electrode of the vacuum tube and the remote terminal of the resistance that is connected to the opposite electrode of the vacuum tube, and a source of space current for said tube connected between an electrode of said tube and the remote terminal of the other of the two resistances that are connected to the electrodes of said tube, the constants of the circuit being such that a current of constant magnitude flows through the connection containing said indicator for different values of the voltage of said space-current source.

6. A Wheatstone bridge circuit comprising ohmic resistances as three arms of the bridge and the cathode-anode impedance of a vacuum tube as the fourth arm, a source of space current connected in a diagonal of the bridge, the ratio of the bridge impedances being such that a constant difference is maintained between the currents flowing through the tube and through an arm connected to one of the electrodes of the tube for different values of applied voltage from said source, and an indicator connected across the series combination of said tube and said last mentioned arm.

7. A Wheatstone bridge circuit comprising three arms composed of ohmic resistances and a fourth arm composed of the cathode-anode impedance of a vacuum tube, a current indicator in a diagonal of the bridge, and a source of space current in the conjugate diagonal of the bridge, the constants of the circuit being such that the change in current through the arm containing the vacuum tube for a given change in voltage of the source of space current is equal and opposite to the change of current through the bridge arm between an electrode of the vacuum tube and a terminal of the diagonal containing the indicator for the same change in voltage of said source.

8. In combination, a plurality of vacuum tubes connected in tandem with respect to transmitted current variations, a common source of space current for supplying the cathode-anode circuits of said vacuum tubes, the cathode-anode impedance of the last one of said tandem-connected tubes comprising one arm of a Wheatstone bridge circuit, the other three arms of which are composed of ohmic resistances, said source of space current being connected to the terminals of a diagonal of the bridge for supplying space current to the last mentioned vacuum tube, and an indicator connected to indicate current variations in the opposite diagonal, the ratio of impedances between the respective bridge arms being such as to maintain a constant magnitude of current in the diagonal associated with said indicator for varying voltages of said source.

9. A balanced circuit comprising a pair of substantially equal ohmic resistances having a terminal of each connected together at a point 3 and their opposite ends terminating at points 2 and 4 respectively, a branch containing an indicator connected between points 2 and 4, a three-element vacuum tube having its anode connected to point 2 and its cathode terminating at a point 1, an ohmic resistance connected between points 1 and 4, a source of space current connected between points 1 and 3, and means to supply variations to be indicated between the cathode and third element of said vacuum tube, the impedance of said ohmic resistance connected between points 1 and 4 being so related to the operating cathode-anode impedance of said tube as to maintain an unbalance current in said branch connected between points 2 and 4 which will be independent of fluctuations in the voltage of said source connected between points 1 and 3.

In witness whereof, we hereunto subscribe our names this 24 day of July A. D., 1923.

JACOB S. JAMMER.
CHARLES T. ANDERSON.